UNITED STATES PATENT OFFICE.

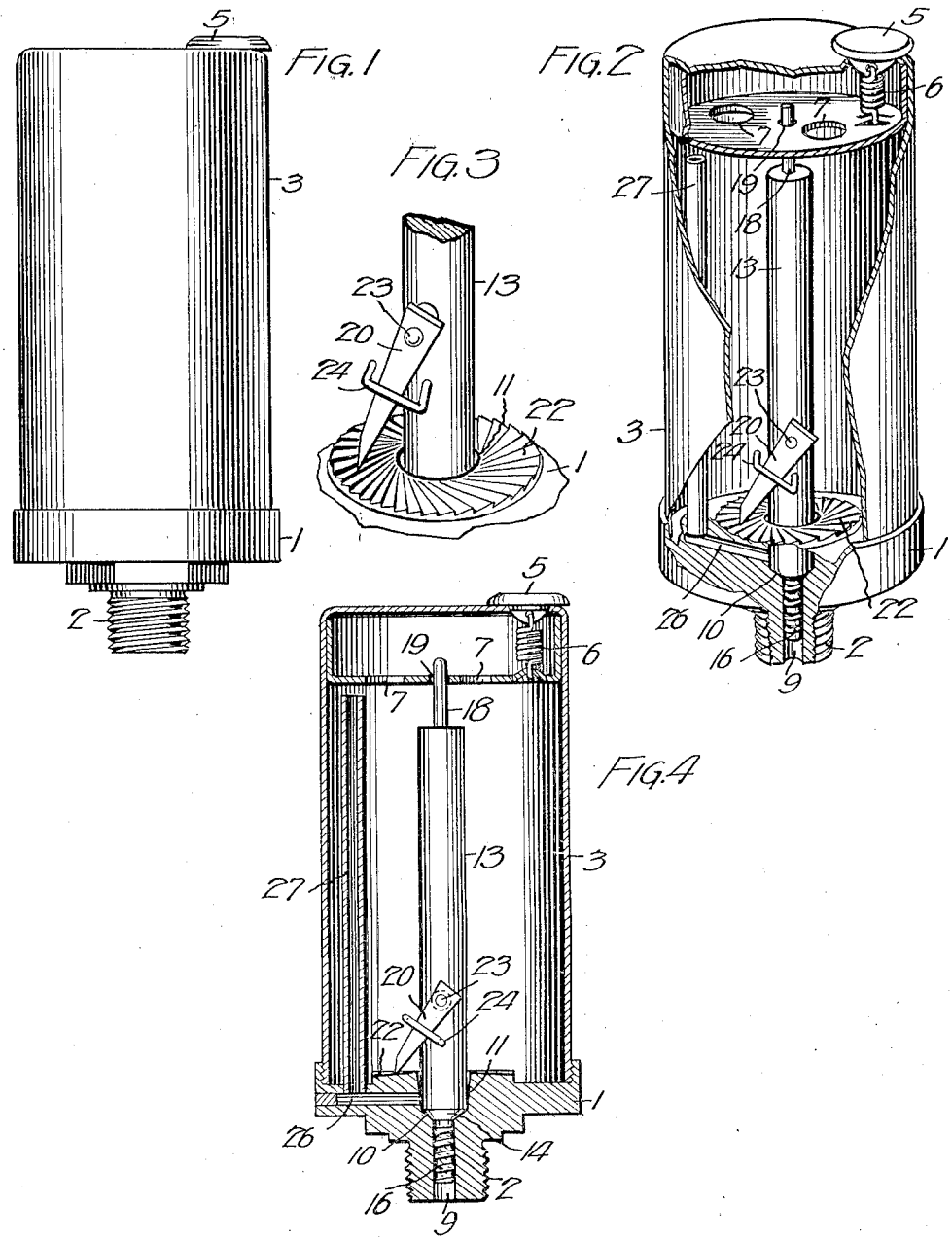

ROBERT FRICK, OF CHICAGO, ILLINOIS.

OILER.

1,357,284. Specification of Letters Patent. Patented Nov. 2, 1920.

Application filed January 17, 1920. Serial No. 352,026.

*To all whom it may concern:*

Be it known that I, ROBERT FRICK, a citizen of the United States, residing at Chicago, in the county of Cook and State of Illinois, have invented a certain new and useful Improvement in Oilers, of which the following is a specification.

My invention relates to oilers, more particularly for road vehicles. Such vehicles are, of course, subjected to considerable vibration when in use, and the object of the invention is to provide a nonpower-driven oiler which will automatically feed the oil and will feed it in proportion to the requirements of the bearings. It is obvious that a vehicle traveling upon a rough road will require a greater amount of lubrication than when traveling on a smooth road, and an oiler constructed according to the principle of my invention will automatically take care of this variation in requirements. Another object is to provide a device of this character which has many of the characteristics of a force feed lubricator and yet dispenses with the need of any power device for its operation. Another object is to provide means for preventing flooding of the bearings.

I accomplish my objects by the mechanism illustrated in the accompanying drawings in which—

Figure 1 is a side elevation of the complete oiler.

Fig. 2 is a side elevation with a portion of the casing broken away to reveal the parts within.

Fig. 3 is a perspective view drawn upon an increased scale showing the ratchet mechanism for rotating the work, and Fig. 4 is an axial section of the complete device.

Like numerals denote like parts throughout the several views.

In the particular form selected to illustrate the invention the device has a base 1 having a threaded nipple 2 adapted to be screwed into the bearing or the oil duct after the manner of ordinary devices of this class. Screwed or otherwise securely fastened to the base is a casing 3 which forms a reservoir or container for the oil. A filler cap 5 is provided at the top of the reservoir for filling purposes and it is desirable to normally hold this cap closed by means of a tension spring 6, the lower end of which is anchored to a spider 7 fastened inside of the reservoir near the top.

Within the nipple 2 is a cylindrical delivery duct 9 at the upper end of which is a valve seat 10. Above this valve seat is a chamber 11 which connects with the inside of the reservoir. A valve stem 13 has a conical valve 14 at its lower end adapted to coöperate with the valve seat 10. Below the valve is a worm 16 which makes a running fit with the cylindrical walls of the duct 9, the result being that when the worm rotates in the proper direction oil will be forced down through the duct. The valve chamber 11 is of sufficient diameter to afford a space between its inner walls and the sides of the valve stem, and hence a moderate amount of oil remains in the chamber above the valve seat.

Stem 13 is guided at the upper end by a pin 18 which fits loosely within an aperture 19 formed at the center of the spider. By preference the worm and the pin are both integral with the valve stem. The stem and parts secured to it are of such size and shape as to be freely movable in a vertical direction. By this I mean that the parts are free enough to enable the vibrations of the vehicle to produce an appreciable amount of vertical movement relatively to the valve seat and passages. I take advantage of this vertical movement to rotate the valve stem and worm, the mechanism for accomplishing the purpose consisting of a pawl 20 and ratchet 22. The pawl is freely pivoted upon a pin 23 projecting from the side of stem 13. It is more or less pointed at its lower end to engage the teeth of ratchet 22. Said ratchet is stationary, being by preference integral with and forming the upper surface of the base 1. It is annular and surrounds the valve chamber 11 as shown. A keeper 24 is fastened to the stem in position to limit the movement of the pawl about its pivot 23. This keeper is so designed that the pawl will always stand oblique to the axis of the stem, but will have a considerable angular movement about its pivot. The proportions of the parts are such that when the pawl stands most nearly upright (but still at an oblique angle) the valve 14 will be held up above its seat 10, thus permitting some of the oil to pass the valve and enter the upper part of the duct 9: but as the stem descends under the action of gravity the obliquity of the pawl will cause the stem to rotate until the pawl strikes the far end of the keeper, whereupon the rotation will be terminated. In some designs the valve may seat before the outer end of the keeper is engaged by the pawl, but in any event the effect of the vertical movement of the stem is to cause the pawl to work its way around the ratchet, thus causing the rotation of the stem and of the worm 16 and actually forcing oil out through the delivery duct 9.

It is desirable to provide a by-pass to prevent flooding of the bearings, said by-pass in the present case consisting of a duct 26 bored horizontally in the base 1, and communicating with the lower end of a stand-pipe or tube 27. Said tube extends to a point near the top of the reservoir so that under proper working conditions the oil from the reservoir can not flow directly down into the by-pass.

Operation: When the oiler is duly charged with oil and the vehicle is traveling upon the road the vibrations produce vertical movement of the stem 13 and parts carried by it. The stem constitutes a weighted element, and as it rises and lifts the suspended pawl it causes the pawl to drop to a more nearly vertical position, an absolutely vertical position being prevented by the keeper 24. When the stem subsequently tends to descend, the pawl, being oblique and having its lower end in engagement with one of the ratchet teeth, opposes a direct descent but permits a simultaneous downward and rotary movement. In other words, the downward force due to the action of gravity is resolved into two components, one of which produces an annular or rotary movement of the stem and of the worm 16. This forces the oil out through the duct 9 and delivers it under a certain amount of pressure to the bearing. Consequently the continued vibrations of the stem produce what is practically a forced feed, although the device does not contain what is ordinarily regarded as a power device for furnishing the power. This action continues as long as the vehicle travels, but ceases the moment the vehicle stops. The result is that oil is delivered only when required. In many motor vehicles the lubricators are positively operated from the engine and consequently if the engine is left running the oil will continue to be delivered to the wheels, steering post, and other parts, although they do not, for the time being, require any oil. My device, therefore, is economical from the fact that it delivers oil only when needed and from the further fact that it requires no power device to operate it, and from the further fact that it delivers oil only in the proportions required.

If oil is delivered faster than required for the bearings, the bearings are not flooded as with the ordinary force feed lubricator, but the surplus is forced up through the duct 26, 27 and back into the reservoir. By thus avoiding flooding of the bearings I obtain another advantage over the ordinary force feed lubricators.

Having thus described my invention what I claim as new and desire to secure by Letters Patent, is:

1. A lubricator having a reservoir, a cylindrical discharge duct leading therefrom, a worm working in said passage, and gravity operated means for rotating said worm.

2. A lubricator for road vehicles having a reservoir with a cylindrical discharge duct, said reservoir being adapted to be fastened to the vehicle and hence vibrate in unison with it, a worm working in said duct, a weighted element whose inertia tends to produce relative movement between it and the vehicle when the reservoir vibrates with the vehicle, and a ratchet device for rotating said worm, said ratchet device having a plurality of elements one of which is connected to the reservoir, and the other to the weighted element for acquiring relative movement to operate the ratchet device.

3. A lubricator for road vehicles having a reservoir with a cylindrical discharge duct and a valve seat controlling said duct, said reservoir being adapted to be fastened to the vehicle and hence vibrate in unison with it, a worm working in said duct, a valve coöperating with said valve seat, said valve being weighted and freely movable and being connected to said worm for rotating it, and a ratchet device having a pawl carried by the valve and an annular ratchet secured to the reservoir.

4. A lubricator for road vehicles having a reservoir with a cylindrical discharge duct and a valve seat controlling said duct, said reservoir being adapted to be fastened to the vehicle and hence vibrate in unison with it, a worm working in said duct, a valve coöperating with said valve seat, a valve stem of considerable weight fastened to said valve, means for guiding said valve stem, rectilinearly, said valve being freely movable and connected to said worm for rotating it, and a ratchet device having a pawl pivotally connected to the valve stem, and an annular ratchet secured to the reservoir.

5. A lubricator for road vehicles having a reservoir with a cylindrical discharge duct and a valve seat controlling said duct, said reservoir being adapted to be fastened to the vehicle and hence vibrate in unison with it, a worm working in said duct, a valve coöperating with said valve seat, a valve stem of considerable weight fastened to said valve, means for guiding said valve stem, rectilinearly, said valve being freely movable and connected to said worm for rotating it, a ratchet device having a pawl pivotally connected to the valve stem, and an annular ratchet secured to the reservoir, and a keeper on said valve stem adapted to limit the pivotal movement of said pawl and hold it at all times oblique to the stem.

6. A lubricator for road vehicles having a reservoir with a cylindrical discharge duct, said reservoir being adapted to be fastened to the vehicle and hence vibrate in unison with it, a worm working in said duct, a weighted element whose inertia tends to produce relative movement between it and the vehicle when the reservoir vibrates with the vehicle, a ratchet device for rotating said worm, said ratchet device having a plurality of elements one of which is connected to the reservoir, and the other to the weighted element for acquiring relative movement to operate the ratchet device, and a by-pass leading from the bottom of the reservoir near the delivery duct to a point inside of the reservoir near the top thereof.

In witness whereof, I have hereunto subscribed my name.

ROBERT FRICK.